US009781789B1

(12) United States Patent
Lee et al.

(10) Patent No.: US 9,781,789 B1
(45) Date of Patent: Oct. 3, 2017

(54) APPARATUS AND METHODS FOR LED CONTROL

(71) Applicant: Allegro Microsystems, LLC, Worcester, MA (US)

(72) Inventors: Nai-Chi Lee, Nashua, NH (US); Vijay Mangtani, Nashua, NH (US)

(73) Assignee: Allegro Microsystems, LLC, Worcester, MA (US)

( * ) Notice: Subject to any disclaimer, the term of this patent is extended or adjusted under 35 U.S.C. 154(b) by 0 days.

(21) Appl. No.: 15/154,372

(22) Filed: May 13, 2016

(51) Int. Cl.
 *H05B 41/32* (2006.01)
 *H05B 33/08* (2006.01)

(52) U.S. Cl.
 CPC ....... *H05B 33/0815* (2013.01); *H05B 33/083* (2013.01); *H05B 33/0851* (2013.01)

(58) Field of Classification Search
 CPC  H05B 33/0815; H05B 41/32; H05B 33/0887; H05B 33/089; H05B 41/28; H05B 41/2825; H05B 41/2985
 USPC .......... 315/224, 225, 307, 121, 209 R, 241 P
 See application file for complete search history.

(56) References Cited

U.S. PATENT DOCUMENTS

| 6,982,527 | B2 | 1/2006 | Lee et al. |
| 8,339,049 | B2 | 12/2012 | Kang et al. |
| 8,456,105 | B2 | 6/2013 | Wang et al. |
| 8,519,630 | B2 | 8/2013 | Wang et al. |
| 8,664,930 | B2 | 3/2014 | Kang et al. |
| 8,742,682 | B1 | 6/2014 | Wang et al. |
| 8,779,805 | B1 | 7/2014 | Fernandez et al. |
| 8,901,835 | B2 | 12/2014 | Kang et al. |
| 8,928,256 | B2 * | 1/2015 | Smith ................ H05B 33/0842 315/112 |
| 8,937,433 | B1 | 1/2015 | Wang et al. |
| 9,294,084 | B1 | 3/2016 | McIntosh et al. |
| 9,425,785 | B1 | 8/2016 | Wibben |
| 2005/0243022 | A1 * | 11/2005 | Negru ................ H05B 33/0857 345/46 |

(Continued)

OTHER PUBLICATIONS

Linear Technology datasheet LT3965 "8-Switch Matrix LED Dimmer", 2016, 24 pages.

(Continued)

*Primary Examiner* — Douglas W Owens
*Assistant Examiner* — Wei Chan
(74) *Attorney, Agent, or Firm* — Daly, Crowley, Mofford & Durkee, LLP (57) ABSTRACT

An LED driver for driving a plurality of series-coupled LEDs includes a bypass switch having first and second terminals coupled across a portion of the LEDs and a control terminal. A slew rate control circuit is responsive to a command input signal and to a feedback voltage associated with the bypass switch and is configured to generate a bypass switch control signal with a controllable slew rate. The slew rate control circuit is further configured to detect a rate of change of the switch feedback voltage and establish the bypass switch slew rate in response to the detected rate of change. Also described is method for controlling a bypass switch coupled across a portion of a plurality of series-coupled LEDs including detecting a rate of change of a voltage associated with the bypass switch and generating a control signal for the bypass switch in response to a command input signal and to the detected rate of change of the voltage.

21 Claims, 8 Drawing Sheets

(56) References Cited

U.S. PATENT DOCUMENTS

| | | | | |
|---|---|---|---|---|
| 2010/0026208 A1* | 2/2010 | Shteynberg | ........ | H05B 33/0815 315/297 |
| 2011/0068701 A1* | 3/2011 | van de Ven | .......... | H05B 33/083 315/185 R |
| 2012/0104952 A1* | 5/2012 | Chen | .................... | H05B 33/083 315/122 |
| 2012/0299500 A1* | 11/2012 | Sadwick | ............ | H05B 33/0887 315/224 |
| 2013/0127354 A1* | 5/2013 | Chiang | .................. | H02M 7/06 315/193 |
| 2013/0257313 A1* | 10/2013 | Battaglia | ................ | H05B 37/02 315/297 |
| 2015/0163877 A1* | 6/2015 | Bordin | ............... | H05B 33/0815 315/186 |
| 2015/0208476 A1* | 7/2015 | Muramatsu | ........ | H05B 33/0815 315/193 |
| 2016/0049939 A1 | 2/2016 | Martin et al. | | |
| 2016/0200245 A1 | 7/2016 | Rivas et al. | | |

OTHER PUBLICATIONS

Texas Instruments datasheet TPS92661-Q1 "High-Brightness LED Matrix Manager for Automotive Headlight Systems", Sep. 2014, 53 pages.

Application as filed Oct. 8, 2015 for U.S. Appl. No. 14/878,274; 26 pages.

* cited by examiner

APPARATUS AND METHODS FOR LED CONTROL

CROSS-REFERENCE TO RELATED APPLICATIONS

Not applicable.

STATEMENT REGARDING FEDERALLY SPONSORED RESEARCH

Not applicable.

FIELD OF THE INVENTION

This invention relates generally to LED drivers and more particularly, to slew rate control of an LED shunt switch.

BACKGROUND

Typical LED systems include an application specific number and configuration of LEDs, a regulator to provide a controlled current to the LED load, and a controller to control the regulator. Some LED applications require the use of multiple parallel strings of series-coupled LEDs and others require only a single string of series-coupled LEDs. Generally controlling the LED current is simpler in the case of a single LED string since the regulator can provide a controlled current to the LED string based on a simple feedback arrangement, such as sensing the voltage across a sense resistor coupled in series with the load.

In some applications for single string LED loads, a bypass or shunt switch may be used to selectively switch in and out a portion of the LEDs in order to achieve different illumination levels. One such application is in automotive head lamps in which part of the LED string can be selectively switched in and out in order to toggle between high beam operation and low beam operation of the head lamps.

Some LED applications require the ability to dim the LEDs. With one type of LED dimming, sometimes referred to as PWM dimming, the intensity of the LEDs is adjusted by turning the LEDs off and on in response to a PWM signal at a variable duty cycle proportional to the desired brightness and with a fixed DC current and frequency (typically 100 Hz to 1 KHz). The PWM signal may be provided to the LED driver from an external source or may be internally generated.

SUMMARY

An LED driver for an LED load comprising a plurality of series-coupled LEDs includes a bypass switch having first and second terminals coupled across a portion of the series-coupled LEDs and a control terminal. A slew rate control circuit is responsive to an input command signal and to a feedback voltage associated with the bypass switch and is configured to generate a control signal with a controlled slew rate for coupling to the control terminal of the bypass switch.

With this described arrangement, part of the LED load can be optionally bypassed by turning on the bypass switch and the slew rate of the bypass switch is controlled based at least in part on a feedback voltage associated with the bypass switch in order to thereby ensure a smooth transition between the full load and the partially bypassed load. Furthermore, control of the bypass switch slew rate in this manner can reduce or even eliminate damaging inrush currents that can occur when part of the load is bypassed (i.e., when the load is abruptly reduced) and also the load current undershoot that can result in LED flickering when the partially bypassed load is transitioned to the full load (i.e., when the load is abruptly increased).

Features may include one or more of the following. The slew rate control circuit may be configured to detect a rate of change of the feedback voltage and the controllable slew rate of the bypass switch control signal may be established in response to the detected rate of change of the feedback voltage. The bypass switch may be provided as a FET and the feedback voltage may be a drain to source voltage of the FET. The slew rate control circuit may include a slope detector responsive to the feedback voltage and configured to generate a slope signal indicative of the rate of change of the feedback voltage and an operational amplifier responsive to the slope signal and to a reference voltage for generating a slew rate control signal. A level shifter configured to shift the level of the slope signal may be coupled between the slope detector and the operational amplifier. The slope detector may include an RC circuit having a controllable gain. In an embodiment the gain of the slope detector is controllable by adjusting a resistance of a resistor of the RC circuit.

Also described is an LED system including an LED load comprising a plurality of series-coupled LEDs, a voltage regulator configured to generate a regulated output voltage for coupling to the LED load, and an LED driver including a bypass switch having first and second terminals coupled across a portion of the series-coupled LEDs and a control terminal. A slew rate control circuit is responsive to a command input signal and to a feedback voltage associated with the bypass switch and is configured to detect a rate of change of the feedback voltage and generate a bypass switch control signal with a controllable slew rate for coupling to the control terminal of the bypass switch in response to the detected rate of change of the feedback voltage. The slew rate control circuit may include a slope detector responsive to the feedback voltage and configured to generate a slope signal indicative of the rate of change of the feedback voltage and an operational amplifier responsive to the slope signal and to a reference voltage for generating a slew rate control signal. A level shifter configured to shift the level of the slope signal may be coupled between the slope detector and the operational amplifier. The slope detector may include an RC circuit having a controllable gain.

The LED driver and/or LED system may include one or more of the following features. A first state of the bypass switch control signal may cause the bypass switch to turn on and shunt the portion of the series-coupled LEDs and a second state of the bypass switch control signal may cause the bypass switch to turn off. The bypass switch may be a low side switch in which case one of the first and second bypass switch terminals is coupled to ground. Alternatively, the bypass switch may be a high side switch in which case neither the first terminal nor the second terminal of the bypass switch is coupled to ground.

In an embodiment, the LED load is a light, a first state of the command input signal corresponds to the light being in a first mode, and a second state of the command input signal corresponds to the light being in a second mode. The command input signal may include a first command input signal in response to which the slew rate control circuit is configured to generate the bypass switch control signal with a first controllable slew rate and may further include a second command input signal in response to which the slew rate control circuit is configured to generate the bypass switch control signal with a second controllable slew rate, faster than the first controllable slew rate. In an embodiment in which the load is a light, the first command input signal may correspond to the light being in a first mode or a second mode, and the second command input signal may be a PWM signal and correspond to the light being dimmed.

Also described is a method for controlling a bypass switch coupled to an intermediate node of an LED string and configured bypass a plurality of LEDs of the LED string when turned on in response to a command input signal. The method includes detecting a rate of change of a voltage associated with the bypass switch and generating a control signal for the bypass switch in response to the command input signal and the detected rate of change of the voltage associated with the bypass switch.

BRIEF DESCRIPTION OF THE DRAWINGS

The foregoing features of the invention, as well as the invention itself may be more fully understood from the following detailed description of the drawings, in which like reference numbers refer to like elements and in which.

DETAILED DESCRIPTION

Figure 1:
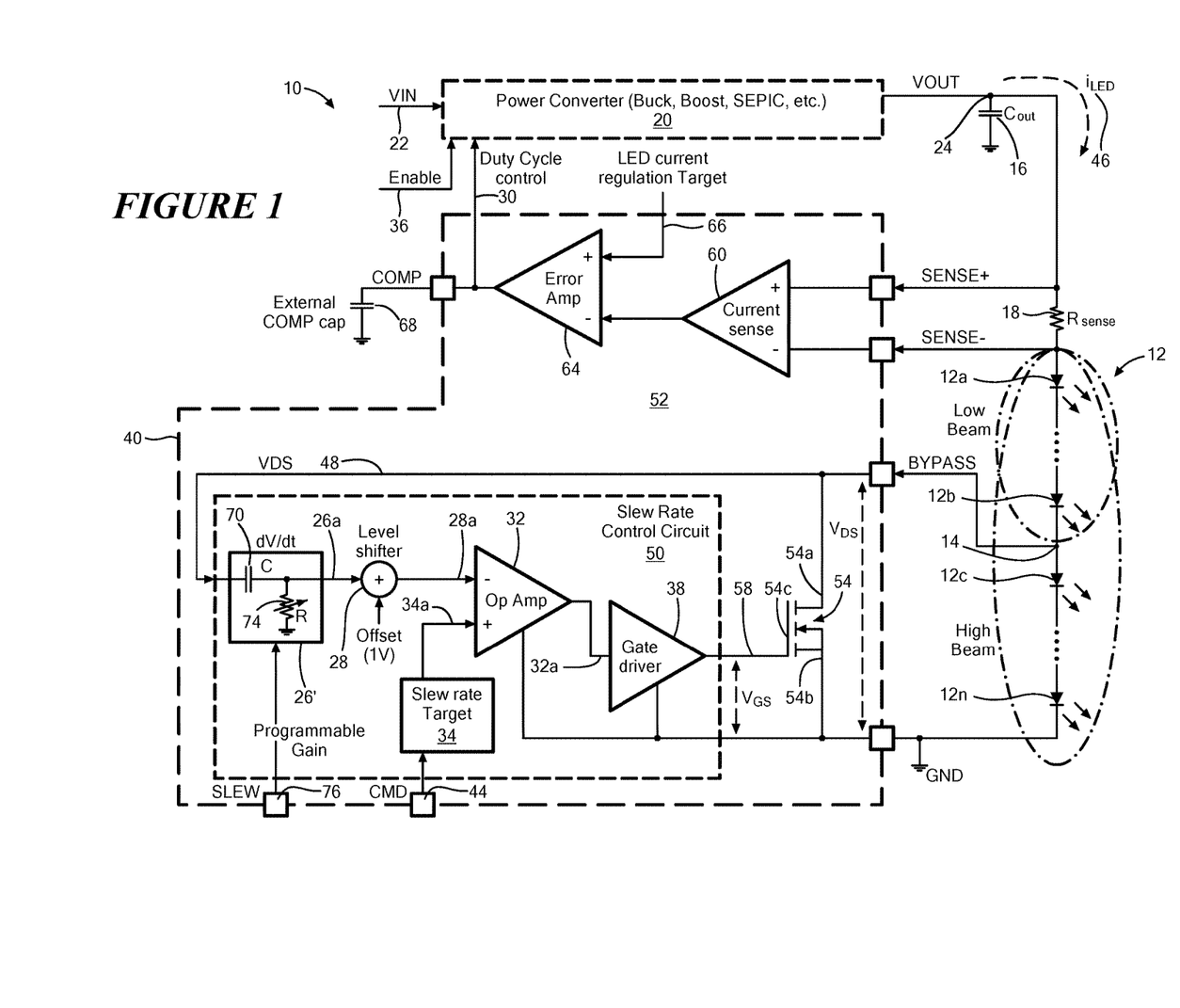
FIG. 1 is a block diagram of an LED driver implementing bypass switch slew rate control of a low side bypass switch.

Referring to FIG. 1, an LED system 10 includes an LED load 12 in the form of a string of series-coupled LEDs 12a-12n, a voltage regulator, or converter 20 configured to generate a regulated output voltage VOUT 24 for coupling to the LED load, and an LED driver 40. The LED driver 40 includes a bypass switch 54, a slew rate control circuit 50, and regulator control circuitry 52. The bypass switch 54 has a first and second terminals 54a, 54b coupled across a portion of the LED string 12. In the embodiment of FIG. 1, the first terminal 54a is coupled to an intermediate node 14 of the series-coupled LEDs and a second terminal 54b is coupled to a reference potential such as ground. A control terminal 54c is coupled to the slew rate control circuit 50.

The slew rate control circuit 50 is responsive to a command input signal CMD 44 and to a feedback voltage 48 associated with the bypass switch 54 (herein, the bypass switch feedback voltage) and is configured to generate a control signal 58 with a controllable slew rate for coupling to the control terminal 54c of the bypass switch 54. The slew rate control circuit 50 will be described in detail below. Suffice it to say here that the circuit 50 is configured to detect a rate of change of the bypass switch feedback voltage 48 and to establish the slew rate of the bypass switch control signal 58 in response to the detected rate of change of the feedback voltage.

With this arrangement, the slew rate control circuit 50 controls the slew rate of the bypass switch 54 in such a way as to ensure smooth transitions between the switch 54 turning on (when part of the load is bypassed to present a partially bypassed load) and the switch turning off (when the full load 12 is presented) by ensuring that the regulator control loop can remain in control and regulate the LED current during such transitions. Control of the bypass switch slew rate in the described manner can reduce and even eliminate potentially damaging inrush currents to the load that can otherwise occur as a result of the charge stored on the regulator output capacitor 16 causing inrush currents when part of the load is bypassed (i.e., when the bypass switch is turned on and the load and therefore also the output voltage is abruptly reduced). Bypass switch slew rate control can also minimize load current undershoot that can result in LED flickering when the partially bypassed load is transitioned to the full load (i.e., when the bypass switch is turned off and the load and therefore also the output voltage is abruptly increased).

The LED load 12 in the form of a string of series-coupled LEDs 12a-12n includes an intermediate node 14 between a first portion of LEDs (e.g., 12c-12n) and a second portion of the LEDs (e.g., 12a-12b). In one operating mode of the system 10, a portion of the load 12 may be bypassed to present a reduced, partially bypassed load to the regulator 20. Such an operating mode may correspond to a low beam mode of operation of a head lamp unit. Here the portion of the load is bypassed by turning on the bypass switch 54 to thereby shunt the intermediate node 14 to ground. In another operating mode of the system 10, the full load 12 may be presented to the regulator 20, as may be achieved by turning off the bypass switch 54. It will be appreciated that the portions of LEDs on either "side" of the intermediate node 14 (i.e., the portion that is bypassed by the switch 54 turning on and the portion that is not bypassed when the switch 54 turns on) can include any number of LEDs suitable for the given application, including one LED.

The voltage regulator 20 may have any suitable topology depending on the relationship between the input voltage VIN 22 and VOUT 24. Example regulators include SEPIC regulators, Boost regulators, ZETA regulators, Buck regulators, or Buck-Boost regulators. The illustrated regulator 20 is a Boost regulator and is responsive to the input voltage VIN 22, an enable signal 36 (as may be used for PWM dimming as explained below), and a duty cycle control signal 30 and is configured to generate the regulated output voltage VOUT 24 across output capacitor 16.

In operation, the regulator 20 is controlled by the duty cycle control signal 30 so as to adjust the output voltage VOUT 24 as necessary to maintain a substantially constant load current $i_{LED}$ 46. The regulator 20 and its control circuitry 52 may implement various types of conventional control schemes such as PWM control, including current mode control or voltage mode control. A sense resistor 18 is coupled between the output of the voltage regulator VOUT 24 and the load 12 and the voltage across the resistor 18 is fed back to the regulator control circuitry 52 and more specifically to a current sense comparator 60. The current sense comparator 60 provides a current error signal to an error amplifier 64 that is further responsive to an LED current regulation target signal 66 that is associated with a target LED current $i_{LED}$ 46, which signal 66 can be preset or predetermined internally to the driver 40 or can be user selectable or programmable or otherwise provided from a source external to the driver. The output of the error amplifier 64 provides a duty cycle control signal COMP 30 across a capacitor 68, which capacitor may be internal or external with respect to the driver 40. The error amplifier 64 and capacitor 68 serve to integrate the duty cycle control signal 30 to achieve smooth voltage regulation by the regulator 20. With this arrangement, if the LED current $i_{LED}$ 46 is below the regulation target 66, then the regulator 20 will increase its duty cycle in response to the duty cycle control signal 30 to increase the output voltage VOUT 24; whereas if the LED current $i_{LED}$ 46 is above the regulation target 66, then the regulator 20 will decrease its duty cycle in response to the duty cycle control signal to decrease the output voltage VOUT 24.

The bypass switch 54 may take various forms. In the illustrated embodiment, the switch 54 is a Field Effect Transistor (FET) and specifically an NMOS FET. Thus, the first bypass switch terminal 54a may correspond to a drain terminal, the second bypass switch terminal 54b may correspond to a source terminal, and the control terminal 54c of the bypass switch may correspond to a gate terminal. Accordingly, in this example embodiment, the bypass switch feedback voltage 48 corresponds to the drain to source voltage (VDS) of the FET 54.

It will be appreciated that other types of switches, including a PMOS FET or an npn or a pnp bipolar transistor may alternatively be used. Also, it will be appreciated that, while the bypass switch 54 is shown to be a single switch element, multiple switches coupled in parallel may be used and/or multiple switches not coupled in parallel and coupled to different portions of LEDs 12a-12n may be provided to achieve independent control of one or more of the LEDs. In other words, while a single switch 54 is shown to bypass a respective portion of the LED string corresponding to LEDs 12c-12n and to thereby permit the load 12 to be in two different configurations, it is possible to provide multiple bypass switches, each coupled across a different respective portion of LEDs in order to thereby permit the load to be configured in more than two different ways. Furthermore, while the illustrated bypass switch 54 is shown to be a so-called "low side switch" that shunts the intermediate node 14 to ground, it is also possible to implement the described bypass switch slew rate control in a high-side switch configuration, as will be described below in connection with FIG. 5.

The slew rate control circuit 50 is responsive to the command input signal CMD 44 and also to the bypass switch feedback voltage 48. In an embodiment in which the LED load 12 is a head lamp unit, the command input signal 44 can be an user provided, externally generated signal to command the reconfiguration of the load to present a partial load during low beam operation (by causing the bypass switch 54 to turn on) and a full load during high beam operation (by causing the bypass switch 54 to turn off). More generally however, the command input signal CMD 44 can be internally or externally generated and can be any input signal configured to command the bypass switch 54 to turn on and off in order to thereby present the load in a first configuration associated with a first mode of operation or in a second configuration associated with the a second mode of operation. Accordingly, the command input signal 44 can be thought of as a mode command or a configuration command since the signal commands the bypass switch to turn on or off and thereby to configure the load to be in one of two configurations that may correspond to one of two operating modes. Herein, operation of the driver under the control of the command input signal CMD 44 will be referred to as mode command operation.

As noted, the slew rate control circuit 50 generates the bypass switch control signal 58 with a controllable slew rate. More particularly, the slew rate control circuit 50 is configured to detect a rate of change of the bypass switch feedback voltage 48 and the slew rate of the bypass switch control signal 58 is controlled in response to the detected rate of change of the feedback voltage 48. To this end, the slew rate control circuit 50 includes a slope detector 26' coupled to the bypass switch feedback voltage 48 and configured to generate a slope signal 26a indicative of the rate of change of the feedback voltage.

Figure 2:
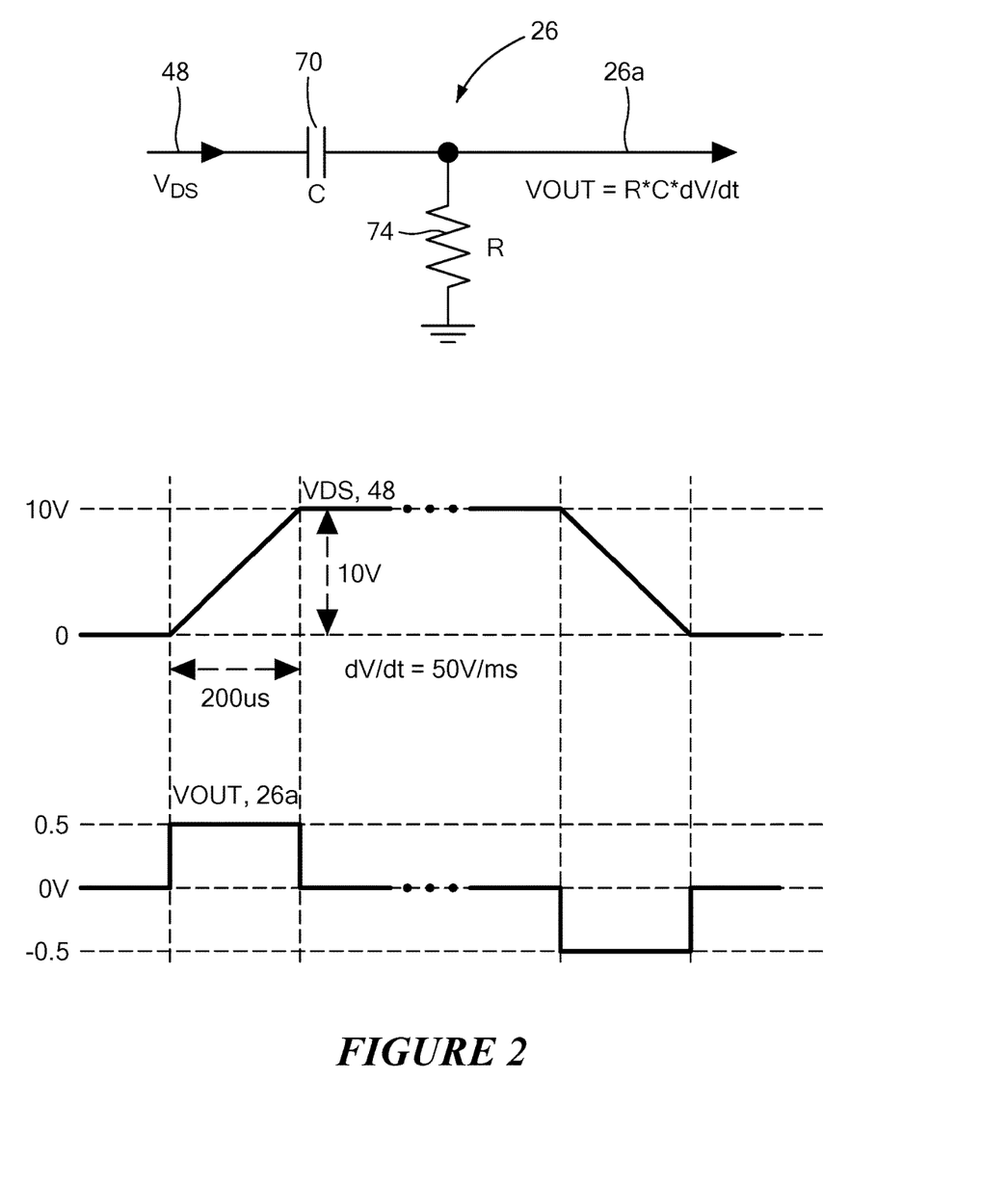
FIG. 2 shows an example slope detector for use in the LED driver of FIG. 1.

Referring also to FIG. 2, an example slope detector 26 can include a simple RC circuit arrangement including a resistor 74 and a capacitor 70. Also shown in FIG. 2 is an example feedback voltage 48, here corresponding to VDS of the bypass switch 54, and a resulting output voltage of the slope detector 26, here corresponding to the slope signal 26a. The relationship of the slope signal 26a to the input voltage 48 is given by R*C*dV/dt. Thus, for an example feedback voltage slew rate of 50V/ms (based on an example output voltage change of 10V over 200 µs), the resulting slope signal 26a is at a level of 0.5V, where resistor 74 has a resistance on the order of 10 KΩ and capacitor 70 has a capacitance on the order of 1 nF.

Referring again to FIG. 1, the slope detector 26' is similar to the circuit of FIG. 2, except that a variable resistor 74' is provided in place of resistor 74 of FIG. 2 and a programmable gain input signal 76 can be provided to adjust the resistance of resistor 74'. By changing the resistance of variable resistor 74', the gain of the slope detector 26 can be varied to achieve a desired bypass switch transition time as will be described. Here, a programmable gain input signal 76 is coupled to the slope detector 26' in order to select a desired slope detector gain. The programmable gain input signal 76 can be preset or predetermined or can be user selectable or programmable or otherwise provided from a source external to the driver.

The slew rate control circuit 50 may optionally further include a level shifter 28 coupled between the slope detector 26 and an operational amplifier 32 to shift the level of the slope signal 26a as may be desired for further processing. In an embodiment, the level shifter 28 may shift the slope signal 26a to be always a positive voltage. For example, the slope signal 26a may vary between −0.5V and +0.5V and the level shifter 28 may respond to an offset input of 1V to adjust the slope signal to vary between 0.5V and 1.5V. It will be appreciated however, that in some embodiments the level shifter 28 may be omitted.

Operational amplifier 32 is responsive to the level-shifted signal 28a (or to the slope signal 26a in embodiments without the level shifter) and to a slew rate target reference signal 34a for generating a slew rate control signal 32a. By comparing the measured slew rate signal 28a to the slew rate target reference signal 34a, the operational amplifier 32 causes the bypass switch control signal 58 to begin transitioning in response to the command input signal 44 and to do so at a rate established by the slew rate control signal 32a. In an embodiment, the command input signal 44 may be provided to a look up table or element by which states of the command signal are converted into a corresponding slew rate target reference signal 34a. For example, in an embodiment in which the load 12 is a head lamp and the command input signal 44 is a two-state signal in which a high voltage level corresponds to a high beam mode of operation and a low signal level corresponds to a low beam mode of operation, the slew rate target circuit 34 may provide the slew rate target reference signal 34a on the order of 0.5V when the command signal 44 is in a high state to command high beam operation and may provide the slew rate target reference signal 34a on the order of 1.5V when the command signal is in a low state to command low beam operation.

With the described arrangement, the operational amplifier 32 compares the level shifted signal 28a (or the slope signal 26a in embodiments without the level shifter 28) that is indicative of the measured slew rate of the bypass switch 54 with the slew rate target reference signal 34a to generate a slew rate control signal 32a. A gate driver 38 is responsive to the slew rate control signal 32a to generate the bypass switch control signal 58.

The LED driver 40 may be provided in the form of an integrated circuit (IC). In such configurations, it will be appreciated that the particular delineation of circuit elements internal and external to the IC may be readily varied to suit a particular application. In other words, various components shown as contained within the IC driver 40 may alternatively be provided external to the IC and vice versa. As one of many examples, the bypass switch 54 may alternatively be provided external to the driver 40. It will also be appreciated that other types of circuit implementations are possible including discrete circuit components, hybrids, and other subassemblies.

As will now be apparent, certain parameters of the slew rate control circuit 50 are selectable or programmable or otherwise adjustable in order to achieve a desired bypass switch slew rate or in other words a desired transition time for the bypass switch 54 to turn on and off (herein "the transition time"). It will be appreciated that the longer the bypass switch transition time, the easier it is for the regulator control circuitry 52 to maintain the LED current $I_{LED}$ 46 constant during output voltage changes as will occur when the load is switched between configurations. The tradeoff however is that the longer the transition time, the higher the losses in the bypass switch 54.

A lower limit to the transition time is the time it takes the output capacitor 16 to discharge when the output voltage 24 drops. In particular, if the LED current $i_{LED}$ 46 is regulated, then the fastest rate that the output voltage VOUT 24 can drop is limited by $dVOUT/dt=i_{LED}/C$, where C is the output capacitor 16. For example, if capacitor 16 has a capacitance of 10 μF and $i_{LED}$ is 0.5 A, then dVOUT/dt=0.05V/μs. Thus, if there is an output voltage change ΔVOUT of 10V between the high beam operation and low beam operation, then a transition time of at least 200 μs is necessary for the bypass switch 54 to turn from off to on.

In practice, the regulator 20 has limited response time and cannot cut off its output voltage 24 immediately. For example, assuming that the gain bandwidth of the regulator control loop is on the order of GBW=10 kHz, approximately three to five times longer than 1/GBW should be allocated to ensure smooth transition of output voltage. Thus, in this example, a transition time on the order of between approximately 300-500 μs may be desirable. The following equation can be used to estimate the total transition time required:

Transition time=$\Delta VOUT/(i_{LED}/C)+3*(1/GBW)$

It will be appreciated that each application of the driver 40 and more specifically of the slew rate control circuit 40 may have different factors and values contributing to the selection of transition time. Once a desired transition time is determined and the bypass switch threshold voltage (i.e., the gate to source voltage required to be applied to the bypass switch in order for the switch to conduct) is known, then the bypass switch slew rate can be determined.

In order to achieve the determined desirable bypass switch slew rate, the slew rate control circuit 50 includes one or more adjustable (i.e., programmable) parameters or variables. Here, the gain of the slope detector 26 and/or the slew rate target reference signal 34a may be individually or collectively adjusted to achieve the desired transition time and thus, the desired slew rate for the bypass switch transitions. In some embodiments, a smaller range of slew rate variation can be implemented by adjusting the slew rate target signal 34a than by adjusting the gain of the slope detector 26.

Figure 3:
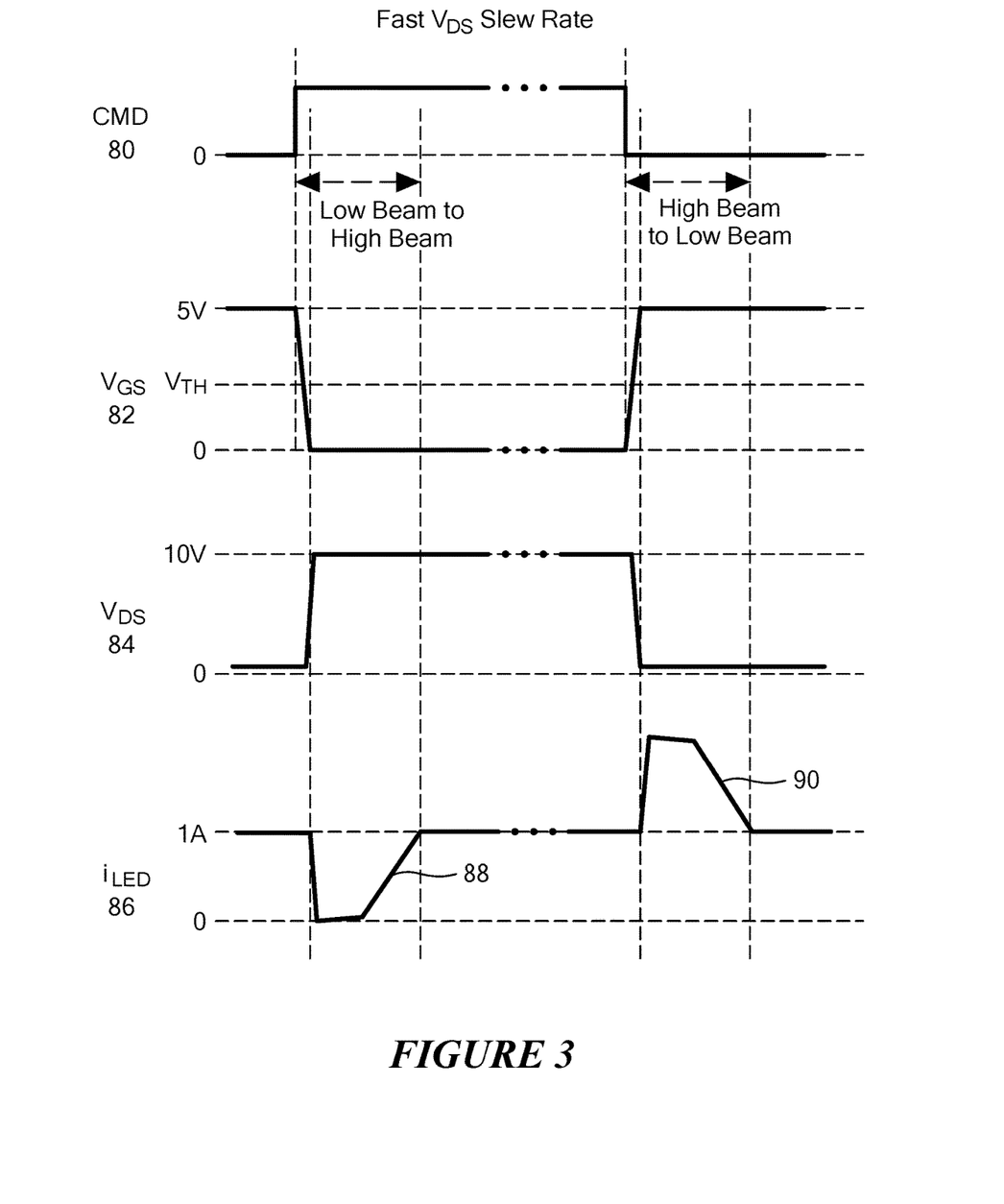
FIG. 3 shows several example waveforms associated with a conventional LED driver that does not contain the slew rate control circuit.

Referring also to FIG. 3, example waveforms are shown as might occur in a conventional LED driver that does not contain the slew rate control circuit of FIG. 1, such conventional LED driver not shown. In other words, the waveforms of FIG. 3 might occur in an LED driver in which a command input signal CMD is directly coupled a gate driver for a bypass switch associated with an LED load that may take the same or a similar form to the LED load 12 of FIG. 1, but for which switch there is no slew rate control implemented. The command input signal 80 toggles from a low logic level to a high logic level to command the bypass switch to open (e.g., to enter a high beam mode of operation) and from the logic high level to the logic low level to command the bypass switch to close (e.g., to enter a low beam mode of operation). A gate to source voltage VGS 82 of the bypass switch responds directly but inversely to the command signal 80 by transitioning from a high level to a low level in order to thereby turn off the switch or by transitioning from a low level to a high level in order to thereby turn on the switch, as shown.

As a result of the bypass switch turning off, the load (again, as may be the same as or similar to the load of FIG. 1) transitions from a partial load configuration requiring less regulated voltage to maintain the desired LED current to a full load configuration requiring more regulated voltage to maintain the desired LED current. This abrupt increase in the required output voltage results in undershoot 88 of the load current $i_{LED}$ 86. Conversely, as a result of the bypass switch turning on, the load transitions from a full load requiring more output voltage to maintain the desired LED current to a partial load requiring less output voltage. The result of this abrupt decrease in required output voltage is that the charge previously stored in the regulator output capacitor can cause a potentially damaging inrush current 90 to be delivered to the load. LED current undershoot 88 can cause visible flickering of an LED load and LED overshoot 90 can damage the LEDs.

Figure 4:
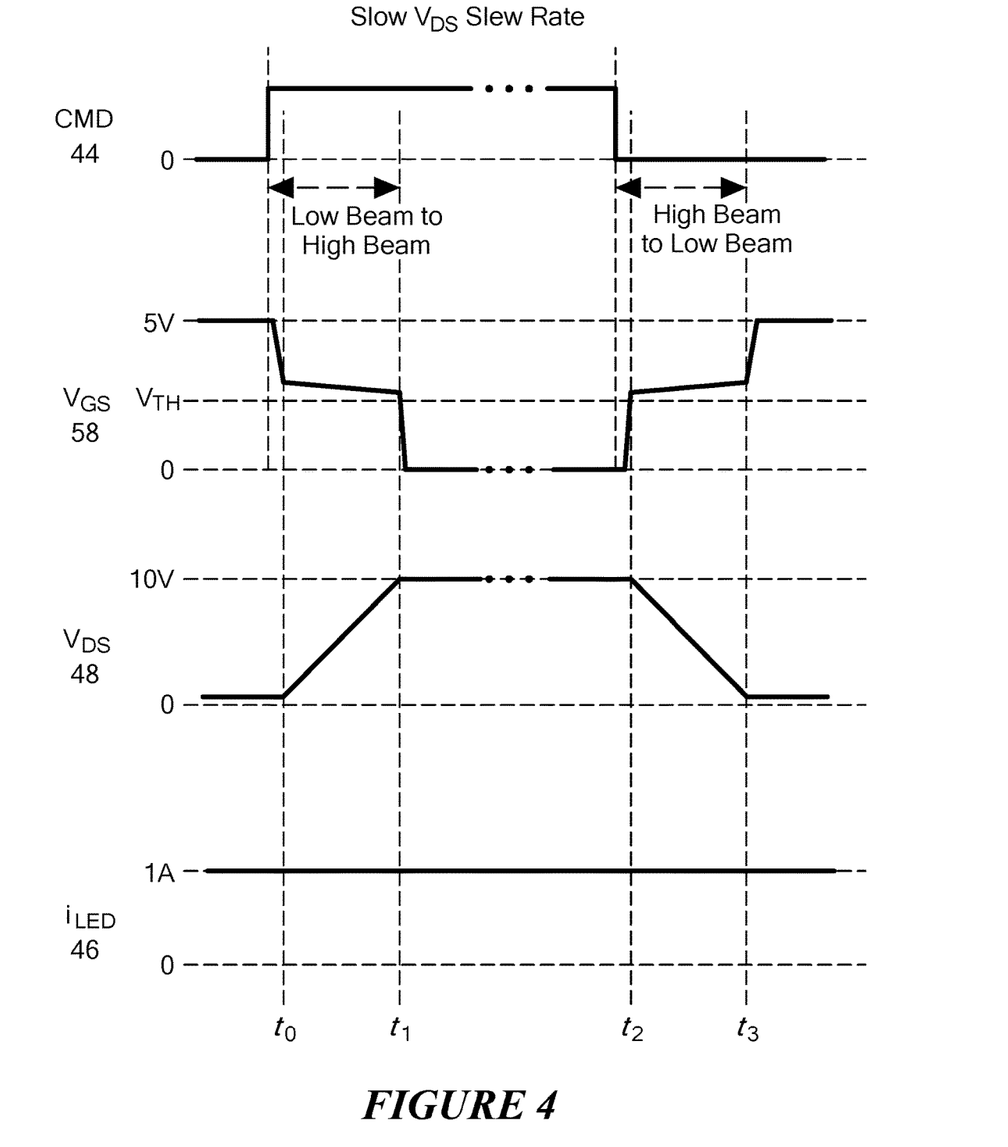
FIG. 4 shows several example waveforms associated with the LED driver of FIG. 1 containing bypass switch slew rate control.

Referring now to FIG. 4, example waveforms associated with the LED system 10 of FIG. 1 (which system includes the bypass switch slew rate control circuit 50 and implements associated methods) illustrate how such LED current overshoot and undershoot conditions can be reduced, and in some cases eliminated, during mode or command input signal transitions. In the example in which the load 12 is a light, the command input signal 44 may control whether the light operates in a first mode such as a high beam mode or a second mode such as a low beam mode. The command input signal 44 transitioning from the low logic level to the high logic level may command the bypass switch 54 to open (e.g., to enter a full load, or high beam mode of operation) and the command input signal 44 transitioning from the logic high level to the logic low level may command the bypass switch to close (e.g., to enter a partial load, or low beam mode of operation).

In response to a low to high level transition of the command signal 44 and with parameters the slew rate control circuit 50 selected to achieve a desired transition time and bypass switch slew rate as explained above, the bypass switch feedback voltage VDS 48 begins to rise at a time t0 and continues to rise during the desired transition time that ends at t1. The slope of this VDS rise is detected by the slope detector 26' and processed by the slew rate control circuit 50 as explained above to generate the bypass switch control signal VGS 58. The bypass switch control signal VGS 58 begins to drop until the conduction threshold $V_{TH}$ of the switch 54 is reached. Because of the non-linear turn on characteristics of the switch 54, the VGS voltage 58 remains at about the conduction threshold level $V_{TH}$ until the desired transition time ends at time t1 at which time the VGS voltage reaches ground, as shown. Conversely, in response to the command input signal 44 transitioning from a logic high level to a logic low level at a time t2, the bypass switch feedback voltage VDS 48 begins to fall and continues to fall during the desired transition time between times t2 and t3. The slope of this VDS fall is detected by the slope detector 26' and processed by the slew rate control circuit 50 as explained above to generate the bypass switch control signal VGS 58. The bypass switch control signal VGS 58 begins to increase until the conduction threshold $V_{TH}$ of the switch 54 is reached and thereafter, because of the non-linear turn off characteristics of the switch 54, remains at about the conduction threshold level $V_{TH}$ until the desired transition time ends at time t3, as shown. The result of this lengthened transition time (as compared to the waveforms of FIG. 3) is the reduction or even elimination of load current overshoot over undershoot.

Although not shown in FIG. 4, it will be appreciated that in practice, some undershoot and overshoot may occur. In general, a disturbance in LED current $i_{LED}$ 46 of approximately 10% or less is generally acceptable as it will not cause visible flickering. In fact, it may even be desirable to optimize the slew rate control circuit parameters to allow for a small amount of overshoot or undershoot since the longer the transition time the more bypass switch losses will occur.

Figure 5:
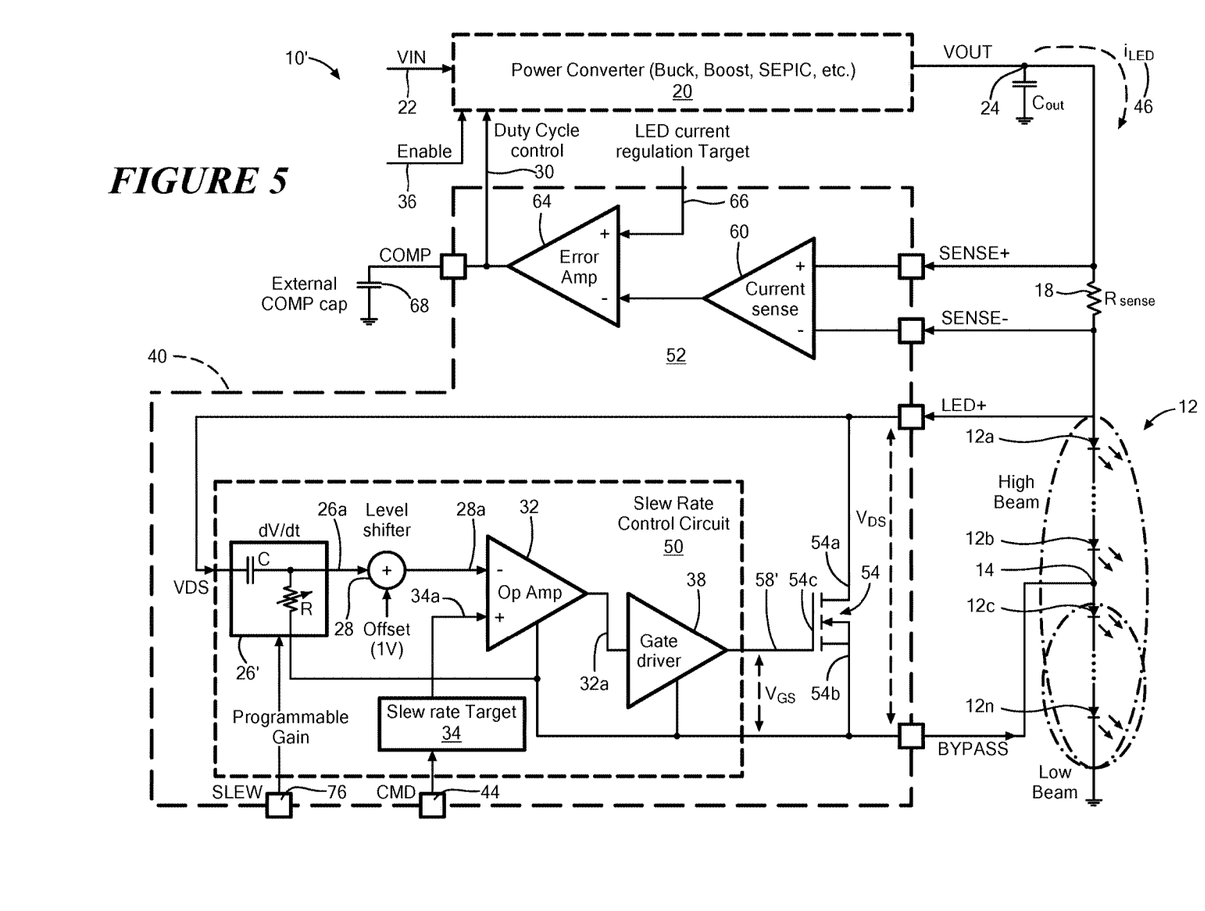
FIG. 5 is a block diagram of an LED driver with switch slew rate control of a high side bypass switch.

Referring to FIG. 5, an alternative LED system 10' is shown to include many of the same components and circuits as FIG. 1 including LED driver 40, as indicated by like reference numbers. The system 10' differs from the system 10 in that the bypass switch 54 is here configured as a so-called high side switch meaning that the first and second terminals 54a, 54b that are coupled across a portion (here across LEDs 12a-12b) are floating rather than being tied to a reference potential such as in the case of the low side switch in FIG. 1. Stated differently, neither the first or second terminals 54a, 54b are tied to ground.

More specifically, the first terminal 54a, here the drain terminal, is coupled to a first end of the LED string 12 and the second terminal 54b, here the source terminal, is coupled to the intermediate node 14. In operation in response to a first state of the command input signal 44 and under the control of the slew rate control circuit 50, when the bypass switch 54 is turned on, a portion of the LED string including LEDs 12a-12b is shunted to thereby present a partial load to the regulator 20; whereas in response to a second state of the command input signal and again, under the control of the slew rate control circuit 50, when the bypass switch 54 is turned off the full load 12 is presented to the regulator 20. In this high side configuration, the slew rate control circuit is thus referenced to the intermediate node 14 of the LED string 12 rather than to ground. In all other relevant respects, the system 10' operates in the same manner as system 10 of FIG. 1 to control the slew rate of the bypass switch.

Figure 6:
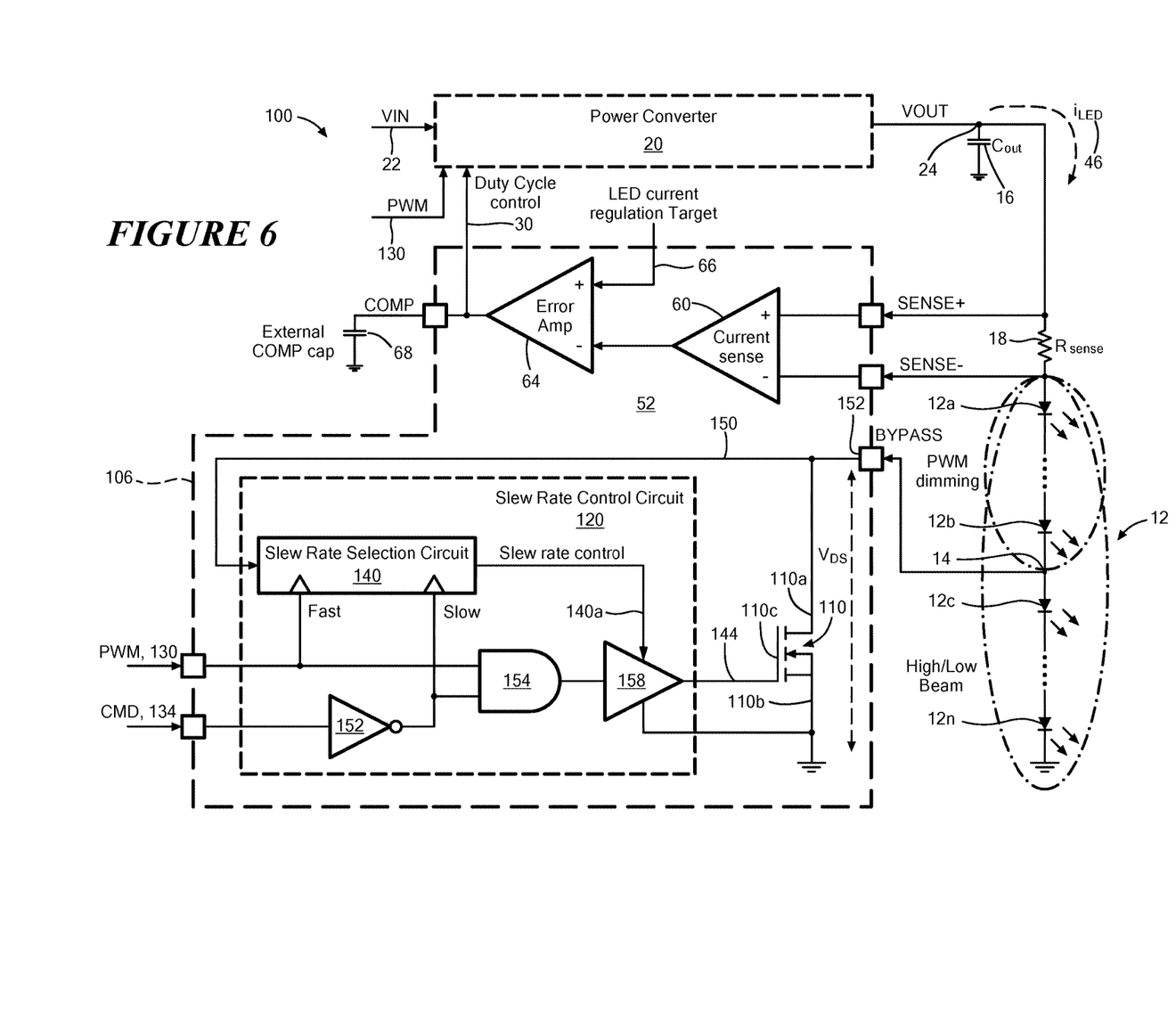
FIG. 6 is a block diagram of an LED driver implementing bypass switch slew rate control and PWM dimming according to the disclosure.

Referring to FIG. 6, an LED system 100 including an LED driver 106 capable of implementing bypass switch slew rate control or PWM dimming is shown in which like reference characters refer to like elements with respect to FIG. 1. Bypass switch slew rate control is as described above. PWM dimming is an operational mode in which the LEDs 12 are rapidly turned on and off at a controlled duty cycle to achieve a dimming effect. By selective control of a PWM signal 130 and a command input signal 134, the LED driver 106 can control a bypass switch 110 to implement either a mode command operation or PWM dimming operation.

In applications in which the slew rate control circuit 120 is used to implement mode command operation under control of a CMD signal 134, the LED load includes the series-coupled LEDs 12a-12n configured as shown so that when the bypass switch 110 is closed, a portion of the LED string including LEDs 12c-12n are bypassed. In applications in which the slew rate control circuit 120 implements PWM dimming, the LED load includes series-coupled LEDs coupled between the sense resistor 18 and input terminal 152 to the driver 106, here shown as LEDs 12a, 12b, but more generally any number of LEDs so coupled. In other words, to implement PWM dimming, additional LEDs coupled between intermediate node 14 and ground for mode command operation (here LEDs 12c-12n) are omitted. With this PWM dimming load configuration, when the bypass switch 110 is turned on, current $i_{LED}$ flows through the LED load; whereas, when the bypass switch 110 is off, the flow of current through the load is interrupted. The power converter stage 20 is synchronized with the PWM signal. It is enabled when LED current is on, and disabled when LED current is off.

The slew rate control circuit 120 includes a slew rate selection circuit 140 having a fast slew rate input 140a and a slow slew rate input 140b. Generally, the bypass switch slew rate during PWM dimming will be significantly faster than for mode command operation. Typically the PWM frequency is at 200 Hz or higher to avoid visible flickering. Accordingly, the PWM signal 130 is coupled to the fast slew rate input 140a and when mode command operation is desired, the command input signal 134 is coupled to the slow slew rate input 140b. The slew rate selection circuit 140 includes several of the same elements as the slew rate control circuit 50 of FIG. 1 and specifically, includes a slope detector (like slope detector 26' of FIG. 1) coupled to receive the bypass switch feedback voltage 150 and generate a slope signal indicative of the rate of change of the feedback voltage 150, an optional level shifter (like level shifter 28 of FIG. 1) to shift the level of the slope signal, and an operational amplifier configured to compare the measured rate of change of the feedback voltage 150 (in the form of the slope signal or the level shifted version of the slope signal) to a slew rate target reference signal (that may be the same as or similar to signal 34a of FIG. 1). Here however, the slew rate target reference signal is associated with either the PWM signal 130 where PWM dimming operation is implemented or with the command input signal 134 where bypass switch operation is implemented. More specifically, the slew rate selection circuit 140 may include a first set of slew rate target reference signal levels corresponding to different states of the PWM signal 130 and a second, different set of slew rate target reference signal levels corresponding to different states of the command input signal 134. In one embodiment, a slew rate target reference signal level associated with the PWM signal 130 may provide a fast bypass switch slew rate, such as on the order of 10V in 10 μs, and a slew rate target reference signal level associated with the command input signal 134 may provide a slower bypasss switch slew rate, such as on the order of 10V in 1 ms. The operational amplifier of the slew rate selection circuit 140 may be the same as or similar to operational amplifier 32 of FIG. 1 and thus, may be responsive to a slew rate target reference signal and to the measured slew rate signal to generate a slew rate control signal 140a. In practice, this change in reference target can be easily achieved by changing the gain of the dV/dt detection stage as shown in FIG. 2.

The PWM signal 130 and an inverted version (following inverter 152) of the CMD signal 134 are additionally coupled to an AND gate 154. The output of the AND gate 154 is coupled to an output driver 158 that may be the same as or similar to driver 38 of FIG. 1 and that generates the bypass switch control signal 144.

In applications in which the slew rate control circuit 120 implements mode command operation, PWM dimming can nevertheless still be provided in a conventional manner; namely, the LEDs 12 may be turned on and off by turning the regulator 20 on and off in response to the PWM signal 130 being coupled to an enable input of the regulator 20, as shown.

Figure 7:
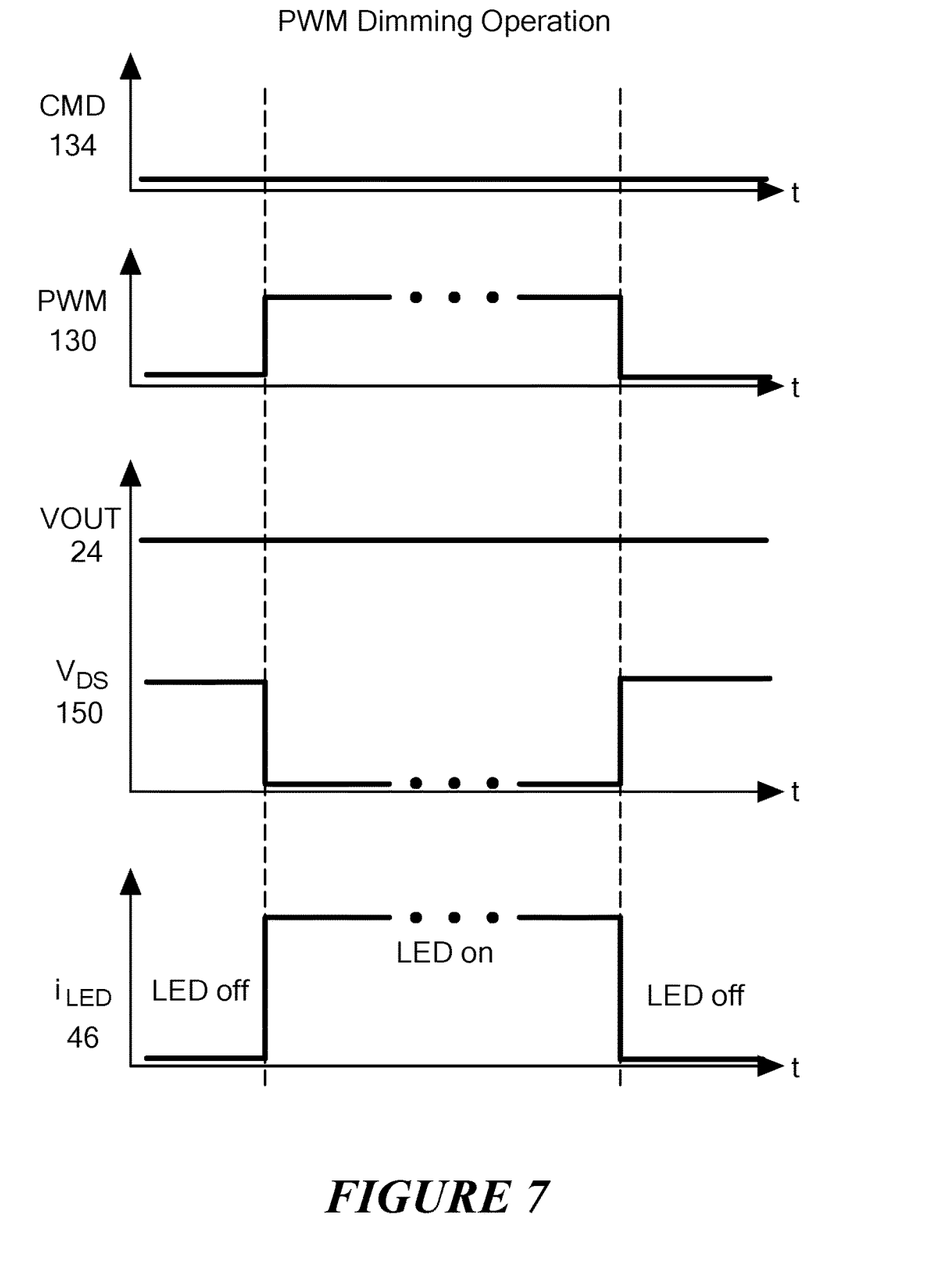
FIG. 7 shows several example waveforms associated with the LED driver of FIG. 6 in a PWM dimming mode of operation.

Referring also to FIG. 7, examples waveforms are shown to illustrate PWM dimming operation of the LED system 10'. In order to initiate PWM dimming, the CMD signal 134 is held at a low logic level, and the PWM signal 130 is toggled to a logic high level causing the bypass switch to turn on and to a logic low level causing the bypass switch 110 to turn off, with such toggling occurring at a rapid rate. In one example, when activated, the PWM dimming signal 130 has a frequency on the order of 200 Hz. The PWM input signal 130 can be provided to the LED driver 100 from an external source or may be internally generated. When the bypass switch 110 turns on, the LED current $i_{LED}$ 46 flows through the LED load 12a-12b, causing the switch feedback voltage 150 (VDS) to collapse. The slope of this fast VDS drop is sensed by the slew rate selection circuit 120 in the manner explained above and the desired slew rate established by the slew rate selection circuit 120 is implemented by the resulting bypass switch control signal 144. When the PWM signal 130 transitions to a logic low level, the bypass switch 110 is turned off, thereby interrupting the flow of load current $i_{LED}$ as shown and causing the VDS voltage 150 to rise at a slew rate established and controlled by the slew rate control circuit 120.

Implementing PWM dimming with the slew rate control circuit 120 permits the bypass switch slew rate to be adjusted to optimize electromagnetic interference (EMI) performance. In other words, the bypass switch slew rate can be tuned to achieve a desired immunity to EMI effects.

Figure 8:
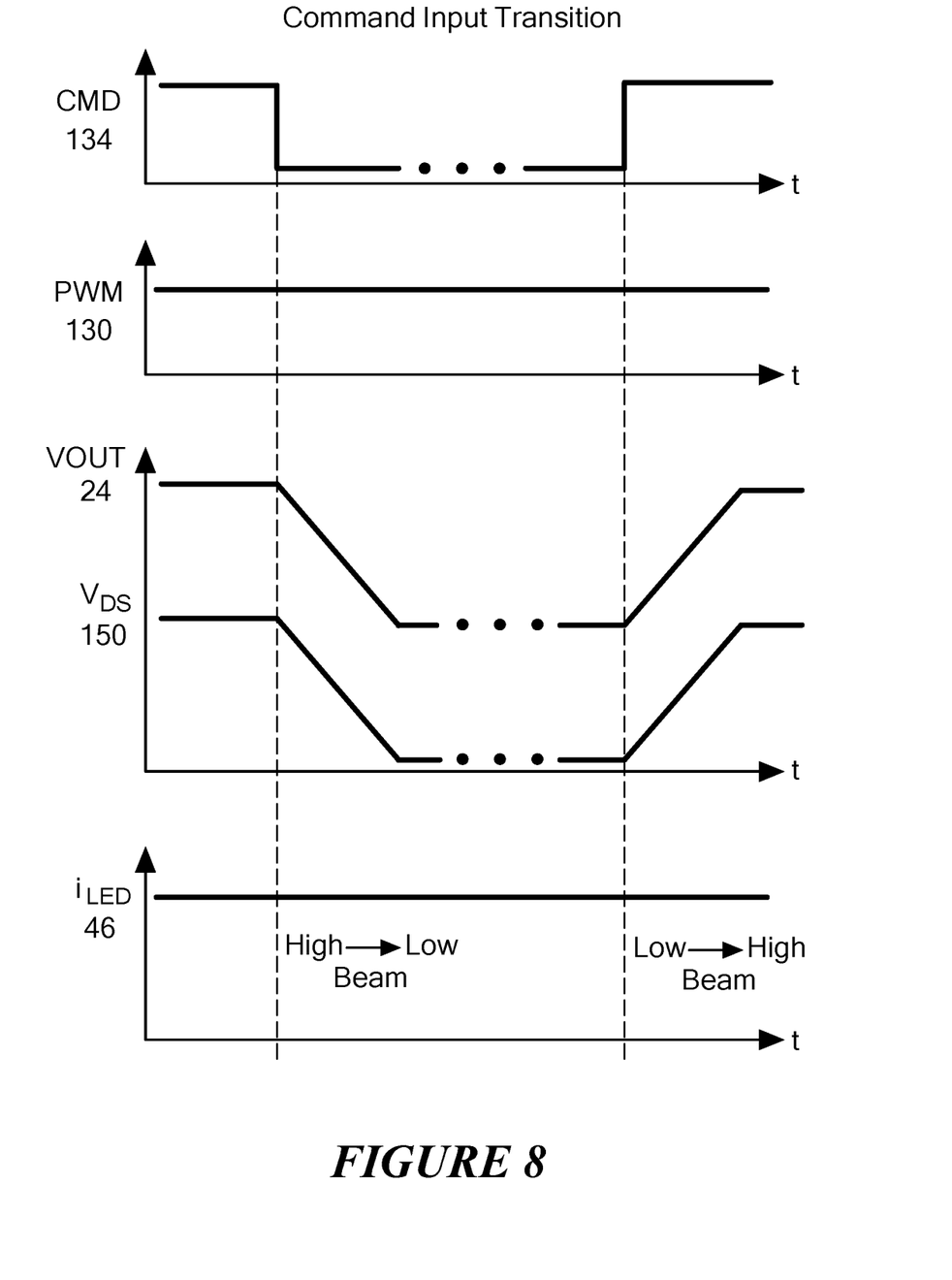
FIG. 8 shows several example waveforms associated with the LED driver of FIG. 6 in a high/low beam mode.

Referring also to FIG. 8, examples waveforms are shown to illustrate mode command operation of the LED system 10' in response to the CMD signal 134. In order to initiate mode command operation, the PWM signal 130 is held at logic high level, and the CMD signal 134 is toggled as desired to effect mode command operation, which in one embodiment can be high beam and low beam operation of an LED light. With the PWM signal 130 held high, the inverted version of the CMD signal as provided at the output of the inverter 152 passes through the AND gate 154 the driver 158, as shown. With the command input signal 134 thus in control of the bypass switch, operation and the relevant waveforms are as described above in connection with FIG. 4. As explained above, by selection and/or adjustment of the slew rate control circuit parameters (e.g., the slope detector gain and/or the target slew rate reference signal), the desired bypass switch transition time and slew rate is achieved in a manner that reduces or even minimizes load current overshoot and undershoot when a mode transition occurs in response to the command input signal.

Given the relative frequencies of the PWM signal 130 and the CMD signal 134, it will be appreciated that the time scale of FIG. 7 is significantly compressed with respect to the time scale of FIG. 8

All references cited herein are hereby incorporated herein by reference in their entirety. Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. An LED driver configured to drive an LED load comprising a plurality of series-coupled LEDs, the LED driver comprising:
   a bypass switch having a first terminal coupled to an intermediate node of the series-coupled LEDs and a second terminal coupled to a reference potential, wherein the intermediate node is disposed between a first portion and a second portion of the series-coupled LEDs; and
   a slew rate control circuit responsive to a command input signal and to a feedback voltage associated with the bypass switch, the slew rate control circuit configured to generate a bypass switch control signal with a controllable slew rate for coupling to a control terminal of the bypass switch;
   wherein the slew rate control circuit is further configured to detect a rate of change of the feedback voltage and wherein the controllable slew rate of the bypass switch control signal is established in response to the detected rate of change of the feedback voltage.

2. The LED driver of claim 1 wherein the bypass switch comprises a FET and the feedback voltage comprises a drain to source voltage of the FET.

3. The LED driver of claim 1 wherein the slew rate control circuit comprises: a slope detector responsive to the feedback voltage and configured to generate a slope signal indicative of the rate of change of the feedback voltage; and an operational amplifier responsive to the slope signal and to a reference voltage for generating a slew rate control signal.

4. The LED driver of claim 3 wherein the slew rate control circuit further comprises a level shifter configured to shift the level of the slope signal and coupled between the slope detector and the operational amplifier.

5. The LED driver of claim 3 wherein the slope detector comprises an RC circuit having a controllable gain.

6. The LED driver of claim 5 wherein the gain of the slope detector is controllable by adjusting a resistance of a resistor of the RC circuit.

7. The LED driver of claim 1 wherein a first state of the bypass switch control signal causes the bypass switch to turn on and shunt the second portion of the series-coupled LEDs and wherein a second state of the bypass switch control signal causes the bypass switch to turn off.

8. The LED driver of claim 1 wherein the bypass switch is a low side switch and one of the first and second terminals of the bypass switch is coupled to ground.

9. The LED driver of claim 1 wherein the bypass switch is a high side switch and neither the first terminal nor the second terminal of the bypass switch is coupled to ground.

10. The LED driver of claim 1 wherein the load is an LED light and a first state of the command input signal corresponds to the light being in a first mode and a second state of the command input signal corresponds to the light being in a second mode.

11. The LED driver of claim 1 wherein the command input signal comprises a first command input signal in response to which the slew rate control circuit is configured to generate the bypass switch control signal with a first controllable slew rate and further comprises a second command input signal in response to which the slew rate control circuit is configured to generate the bypass switch control signal with a second controllable slew rate, faster than the first controllable slew rate.

12. The LED driver of claim 11 wherein the LED load is a light, the first command input signal corresponds to the light being in a first mode or a second mode, and the second command input signal comprises a PWM signal and corresponds to the light being dimmed.

13. An LED system comprising:
an LED load comprising a plurality of series-coupled LEDs;
a voltage regulator configured to generate a regulated output voltage for coupling to the LED load; and
an LED driver, comprising:
a bypass switch having first and second terminals coupled across a portion of the plurality of series-coupled LEDs and a control terminal; and
a slew rate control circuit responsive to a command input signal and to a feedback voltage associated with the bypass switch, the slew rate control circuit configured to detect a rate of change of the feedback voltage and to generate a bypass switch control signal with a controllable slew rate for coupling to the control terminal of the bypass switch in response to the detected rate of change of the feedback voltage, wherein the slew rate control circuit comprises:
a slope detector responsive to the feedback voltage and configured to generate a slope signal indicative of the rate of change of the feedback voltage; and
an operational amplifier responsive to the slope signal and to a reference voltage for generating a slew rate control signal.

14. The LED system of claim 13 the slew rate control circuit further comprises a level shifter configured to shift the level of the slope signal and coupled between the slope detector and the operational amplifier.

15. The LED system of claim 13 wherein the slope detector comprises an RC circuit having a controllable gain.

16. The LED system of claim 13 wherein the LED load is a light and a first state of the command input signal corresponds to the light being in a first mode and a second state of the command input signal corresponds to the light being in a second mode.

17. The LED system of claim 13 wherein the command input signal comprises a first command input signal in response to which the slew rate control circuit is configured to generate the bypass switch control signal with a first controllable slew rate and further comprises a second command input signal in response to which the slew rate control circuit is configured to generate the bypass switch control signal with a second controllable slew rate, faster than the first controllable slew rate.

18. The LED system of claim 17 wherein the LED load is a light, the first command input signal corresponds to the light being in a first mode or a second mode, and the second command input signal comprises a PWM signal and corresponds to the light being dimmed.

19. A method for controlling a bypass switch having a first terminal coupled to an intermediate node of a plurality of series-coupled LEDs and a second terminal coupled to a reference potential, wherein the intermediate node is disposed between a first portion and a second portion of the plurality of series-coupled LEDs and the bypass switch is configured to bypass the second portion of LEDs when turned on in response to a command input signal, the method comprising:
detecting a rate of change of a feedback voltage associated with the bypass switch; and
generating a bypass switch control signal for the bypass switch in response to the command input signal and the detected rate of change of the feedback voltage associated with the bypass switch.

20. An LED driver configured to drive an LED load comprising a plurality of series-coupled LEDs, the LED driver comprising:
a bypass switch having first and second terminals coupled across a portion of the series-coupled LEDs and a control terminal;
a slew rate control circuit responsive to a command input signal and to a feedback voltage associated with the bypass switch, the slew rate control circuit configured to generate a bypass switch control signal with a controllable slew rate for coupling to the control terminal of the bypass switch, wherein the slew rate control circuit is further configured to detect a rate of change of the feedback voltage and wherein the controllable slew rate of the bypass switch control signal is established in response to the detected rate of change of the feedback voltage; and
a slope detector responsive to the feedback voltage and configured to generate a slope signal indicative of the rate of change of the feedback voltage.

21. An LED driver configured to drive an LED load comprising a plurality of series-coupled LEDs, comprising:
means for switching having first and second terminals coupled across a portion of the plurality of series-coupled LEDs and a control terminal; and
means for detecting a rate of change of a feedback voltage associated with the means for switching and for generating a switch control signal with a controllable slew rate for coupling to the control terminal of the means for switching in response to the detected rate of change of the feedback voltage, wherein the means for detecting comprises:
first means for generating a slope signal indicative of the rate of change of the feedback voltage; and
second means for generating a slew rate control signal in response to the slope signal and to a reference voltage.

* * * * *

UNITED STATES PATENT AND TRADEMARK OFFICE
CERTIFICATE OF CORRECTION

PATENT NO.       : 9,781,789 B1
APPLICATION NO.  : 15/154372
DATED            : October 3, 2017
INVENTOR(S)      : Nai-Chi Lee et al.

It is certified that error appears in the above-identified patent and that said Letters Patent is hereby corrected as shown below:

On the Title Page

Item (57), Abstract, Line 11, replace "is method" with --is a method--

In the Specification

Column 3, Line 8, replace "configured bypass" with --configured to bypass--

Column 5, Line 52, replace "an user provided" with --a user provided--

Column 5, Line 62, replace "the a second mode" with --a second mode--

Column 7, Line 63, replace "40" with --50--

Column 8, Line 28, replace "VGS 82" with --$V_{GS}$ 82--

Column 9, Line 5, replace "VDS 48" with --$V_{DS}$ 48--

Column 9, Line 7, replace "VDS" with --$V_{DS}$--

Column 9, Lines 10 and 11, replace "VGS 58" with --$V_{GS}$ 58--

Column 9, Lines 13 and 15, replace "VGS" with --$V_{GS}$--

Column 9, Line 19, replace "VDS 48" with --$V_{DS}$ 48--

Column 9, Line 21, replace "VDS" with --$V_{DS}$--

Column 9, Line 24, replace both instances of "VGS 58" with --$V_{GS}$ 58--

Signed and Sealed this
Twenty-sixth Day of June, 2018

Andrei Iancu
*Director of the United States Patent and Trademark Office*

CERTIFICATE OF CORRECTION (continued)
U.S. Pat. No. 9,781,789 B1

Column 10, Lines 37 and 43, remove "140a"

Column 10, Lines 38 and 45, remove "140b"

Column 11, Line 27, replace "examples" with --example--

Column 11, Line 40, replace both instances of "VDS" with --$V_{DS}$--

Column 11, Line 47, replace "VDS" with --$V_{DS}$--

Column 11, Line 55, replace "examples" with --example--

Column 11, Line 58, replace "at logic" with --at a logic--

Column 11, Line 64, replace "154 the driver" with --154 and the driver--